D. F. STAYMAN.
PISTON VALVE.
APPLICATION FILED AUG. 12, 1909.

974,534.

Patented Nov. 1, 1910.

Witnesses:
C. W. Lovell
H. J. Kingsley

Inventor
David F. Stayman,
By his Attorney
Wm Bodge

UNITED STATES PATENT OFFICE.

DAVID F. STAYMAN, OF NEW YORK, N. Y.

PISTON-VALVE.

974,534.

Specification of Letters Patent.

Patented Nov. 1, 1910.

Application filed August 12, 1909. Serial No. 512,493.

*To all whom it may concern:*

Be it known that I, DAVID F. STAYMAN, a citizen of the United States, and a resident of New York, in the county of New York and State of New York, have invented certain new and useful Improvements in Piston-Valves, of which the following is a specification.

The invention relates to improvements in piston-valves or cylinder-pistons; and the object of the same is to provide a self-adjusting ring therefor composed of a plurality of sections and having means for their joint support in yielding engagement with the walls of the cylinder.

The invention also has for its object certain details of construction hereinafter set forth.

Figure 1:
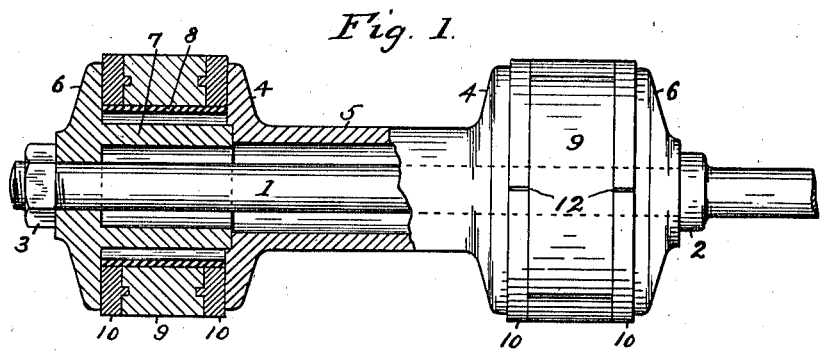
Figure 2:
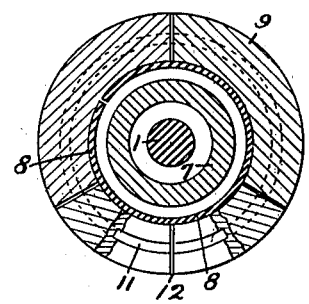
Figure 3:
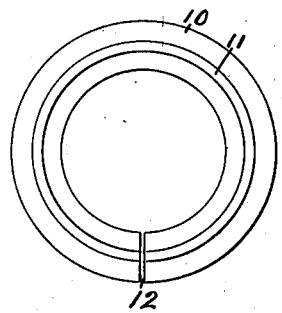

In describing the invention in detail reference is had to the accompanying drawings, forming a part of this specification, and wherein like characters of reference are used to designate like parts throughout the several views, and in which:

Figure 1 is a side view, partially in section, of a piston-valve embodying the invention; Fig. 2, a transverse sectional view through one of the heads; and Fig. 3, a detail side view of a binder-ring for connecting the several sections of the piston-rings.

In the drawings, numeral 1 designates a central valve-stem, provided with a fixed collar 2, and a nut 3. Removably secured upon the stem by the nut and collar is the valve-body, comprising two pairs of circular head-flanges; the inner flanges 4 of each head being connected together by the integral tubular member 5, and the outer flanges 6 bearing upon the stem and provided with annular sleeves 7, which engage recesses formed in the opposing flanges for securing alinement of the parts. Between each pair of head-flanges 4 and 6 and in sliding engagement therewith is disposed a spring-ring 8, having free ends and composed of suitably tempered material and adapted to yieldingly and outwardly urge the sectional piston-ring 9 and the binder-rings 10. The piston-ring is preferably made in three sections, and for their joint connection grooves are formed in the side faces thereof to receive corresponding tongues 11, formed on the adjacent faces of the binder-rings. A transverse slot 12, extending through the binder-rings, permits of the latter's contraction and expansion under the action of the spring-ring 7, which action likewise causes a corresponding movement of the sectional piston-ring to effect a self-adjusting tension between the latter and the walls of the cylinder.

While I have shown the piston-ring as being formed in three parts, it will be understood that it may be divided in two or more sections, and it will also be evident that the binder-rings may each be made in several sections and the parts so disposed with relation to the sectional piston-ring as to cover all joints for the prevention of the leakage of steam or other fluid introduced into the cylinder.

What I claim as my invention and desire to secure by Letters Patent, is:—

1. A piston or packing ring comprising a plurality of annular segments having concentric grooves formed in the opposite side faces thereof, expansible binder-rings contiguous with said opposite side faces, and annular tongues formed on said binder-rings and engaging the grooves in said piston-ring segments.

2. A piston or packing ring comprising a plurality of annular segments, expansible binder-rings disposed on opposite sides thereof, and annular tongue and groove connections between said piston-ring and segments and binder-rings.

3. In a piston or packing ring, the combination with a plurality of annular segments, of binder-rings disposed on opposite sides thereof and comprising transversely-split elastic rings, and annular tongue and groove connections between said annular segments and binder-rings.

4. In a piston, the combination of a piston-head having spaced flanges, a transversely-divided sectional piston-ring disposed between said piston-head flanges, expansible binder-rings disposed on opposite sides of said sectional piston-ring, annular tongue and groove connections between said sectional piston-ring and binder-rings, and a spring-ring disposed between said piston-head flanges and engaging said binder-rings.

5. In a piston, the combination of a piston-head having spaced flanges, a transversely-divided sectional piston-ring disposed between said piston-head flanges and having annular side grooves, binder-rings on opposite sides of said sectional piston-ring engaging the inner faces of the piston-head flanges, annular tongues formed on said binder-rings and engaging the side grooves of the sectional piston-ring, and a spring-ring disposed between said piston-head flanges and engaging said binder-rings and sectional piston-ring.

6. In a piston-valve, the combination of a valve-rod, a pair of piston-heads mounted thereon, each provided with a pair of spaced flanges, transversely-divided sectional piston-rings disposed between the flanges of said piston-heads, binder-rings on opposite sides of said sectional piston-rings engaging the inner faces of the piston-head flanges, annular tongue and groove connections between the sectional piston-rings and the binder-rings, and spring-rings engaging said binder-rings and sectional piston-rings.

Signed at New York in the county of New York and State of New York this ninth day of August A. D. 1909.

DAVID F. STAYMAN.

Witnesses:
HENRY R. CARBERRY,
C. W. LOVELL.